United States Patent Office 2,936,296
Patented May 10, 1960

2,936,296

POLYESTERS FROM TEREPHTHALIC ACID, ETHYLENE GLYCOL AND A HIGHER POLYFUNCTIONAL ALCOHOL

Frank M. Precopio and Daniel W. Fox, Schenectady, N.Y., assignors to General Electric Company, a corporation of New York No Drawing. Application December 10, 1954
Serial No. 474,624

39 Claims. (Cl. 260—33.4)

This invention relates to synthetic polyester resin and electrical conductors coated therewith. More particularly, this invention relates to synthetic polyester resins comprising the product of reaction of (1) a lower dialkyl ester of a member selected from the class consisting of terephthalic acid and isophthalic acid and mixtures of said members, (2) ethylene glycol, and (3) a saturated aliphatic polyhydric alcohol having at least three hydroxyl groups.

In the past, many attempts have been made to prepare synthetic resins suitable for use as electrical insulating material, particularly material which is satisfactory for use as slot insulation in dynamoelectric machines and for use as insulation for conductors which are to be employed as magnet wires (insulated electrical conductors) in electrical apparatus. It is well known that insulating material which is to be employed for these purposes must be able to withstand extremes of mechanical, chemical, electrical and thermal stresses. Thus, wires to be employed as coil windings in electrical apparatus are generally assembled on automatic or semi-automatic coil winding machines which, by their very nature, bend, twist, stretch and compress the enameled wire in their operation After the coils are wound, it is common practice to coat them with a varnish solution containing solvents such as ketones, alcohols, phenols and substituted phenols, aliphatic and aromatic hydrocarbons, halogenated carbon compounds, etc. Magnet wire insulation must be resistant to these solvents. In order to conserve space in electrical apparatus, it is essential that the individual turns which make up the coils be maintained in close proximity to each other. Because of the closeness of the turns and the fact that there may be a large potential gradient between adjacent turns, it is necessary that the resins employed as wire enamels have a high dielectric strength to prevent short circuiting between adjacent coils. In operation of electrical apparatus containing coiled wires, high temperatures are often encountered and the enamels must be able to withstand these high temperatures as well as the mechanical stresses and vibrations encountered in electrical apparatus so that the enamel coating does not soften or come off the wire.

It is well known that the power output of motors and generators can be increased a great deal by increasing the current density in the magnet wires of these machines. However, it has not been practical in the past to increase the current density through magnet wires to the extent desired because of the attendant rise in the operating temperature of the magnet wires caused by the increased current. This increased temperature has meant that conventional organic enamels, which have been relatively economical, could not be used in high current density windings because the higher operating temperatures encountered caused decomposition of the enamel. One method of allowing increased current densities in magnet windings has been to use so-called "class B" insulation on the magnet wires. This class B insulation is mostly inorganic in nature and comprises an inorganic fibrous material such as asbestos or glass fibers with an inorganic binder or an organic binder holding the inorganic fibers together. Class B insulated magnet wires has been found to be deficient in magnet wire applications since its resistance to abrasion is so low that it has been impossible to fabricate coils of class B magnet wire on automatic wire winding machines without tearing and shredding the insulation with the subsequent short circuiting of the coils in use. Another drawback to class B insulated magnet wires is that the insulation tends to be bulky so that it is impossible to place the wires as close together as organic film insulated wires. Since class B insulated wires require hand manipulation, it has been found that the cost per unit power output in a class B insulated motor is higher than the corresponding cost per unit power output in a motor using conventional organic coated wires even though the class B insulated product may have a higher power output per unit of conductor cross section.

In the past, many attempts have been made to prepare magnet wires which meet all of the mechanical, chemical, electrical and thermal requirements of high temperature magnet wire while still being economically feasible. Cost per unit power output of a resulting dynamoelectric machine is a very important factor in any magnet wire insulation since an excessive magnet wire cost tends to make a magnet wire impractical for use regardless of its properties. Excessive cost of a magnet wire is generally the result of one of the following five factors. The first, and the most obvious, factor is the cost of the raw materials in the resin which is to be applied to the conductor. The second cost factor is related to the ability of the resinous material to be dissolved in readily available, inexpensive solvents. Since resinous materials are preferably stored and transported in solution, the bulk and weight of the solvent play a large part in the cost of having the resin at the place where it is to be used at the time it is to be used. In practice, it has been found that it is desirable to employ resinous materials as wire enamels which are capable of being held in solutions which contain at least 30 to 50 percent, by weight, of solids. Since the solvents in the resinous solution are generally allowed to escape without recovery from the wire coating apparatus, the cost of the solvent is an important factor in the cost of the cured enamel. The third factor which vitally affects the cost of an enameled wire is the time required to cure the enamel once it has been applied to the conductor. If this time is excessive, an unduly large baking oven is required or the speed of the wire through the oven must be maintained at an uneconomically low rate. The fourth factor which vitally affects the cost of a magnet wire is the flexibility of the conditions which may be employed in applying the resin to the conductors and in curing the resin once it has been applied. If the wire speed range in the curing operation, the curing temperature, and the wire diameter sizes are critical, it is obvious that a large amount of defective magnet wire may be prepared under mass production conditions, whereas, if large variations in curing conditions are allowable, only a very small amount of the magnet wire prepared need be discarded because of defective insulation. The fifth factor which is important in the cost of a magnet wire is the ability of the same resinous solution to be applied to both round and rectangular conductors and to conductors made of various metals. If different resin solutions must be used for each type of conductor, the time required to change the resin solution is an integral part of the magnet wire cost.

In order to determine whether the insulation on a magnet wire will withstand the mechanical, chemical, electrical and thermal stresses encountered in winding machines and electrical apparatus, it is customary to apply the resin to a conductor by a method which will be described hereinafter and to subject the enameled wire to a series of tests which have been designed to measure the various properties of the enamel on the wire. These tests, which will be described in detail later, include the abrasion resistance test, the 25 percent elongation plus 3X flexibility test, the 70–30 solvent resistance test, the 50–50 solvent resistance test, the dielectric strength tests, the elongation after heat aging test, the heat shock test, the cut-through temperature test, the high temperature weight loss test, and the high temperature dielectric strength loss test.

We have found that the enamel on a conductor which will withstand the mechanical, chemical and electrical stresses encountered in magnet wire applications and which is operable at temperatures of at least 135° C. for extended periods of time must withstand at least 30 strokes in the abrasion resistance test, must pass the 25 percent elongation plus 3X flexibility test, must show no attack on the insulation in either of the solvent resistance tests, must have a dielectric strength of at least 2000 volts per mil, mercury immersion, twisted pair, or aluminum foil. In addition, this insulated conductor must show no insulation defects when elongated 15 percent after heat aging for 100 hours at 185° C. or when elongated 9 percent after heat aging for 24 hours at 225° C., must show no insulation defects in windings having a diameter more than five times the diameter of the conductor when wound on a conical mandrel having an apex angle of about 20 degrees in the heat shock test, must have a cut-through temperature greater than 175° C., must show less than a 3 percent insulation weight loss when heated in a sealed tube for 1000 hours at 200° C., and must not show a loss in dielectric strength of more than 70 percent after heat aging in 25 percent relative humidity air for 500 hours at 200° C.

An object of this invention is to provide a synthetic polyester resin which is thermally stable at temperatures of at least 135° C. for extended periods of time.

A further object of this invention is to provide a synthetic polyester resin which has improved mechanical, chemical, electrical and thermal properties and which is adaptable for use as a coating for electrical conductors which are to be employed as magnet wires.

A still further object of this invention is to provide an improved polyester resin which is adaptable for use as slot insulation in dynamoelectric machines at temperatures of at least 135° C.

A still further object of this invention is to provide an improved insulated electrical conductor which is adaptable for use as magnet wire for continuous operation at temperatures of at least 135° C.

We have discovered an economical polyester resin having improved mechanical, chemical, electrical and thermal properties which is adaptable for use as magnet wire insulation and slot insulation in electrical apparatus. This resin comprises the product of reaction of (1) from 25 to 56 equivalent percent, preferably from 36 to 50 equivalent percent, of a lower dialkyl ester of a member selected from the class consisting of terephthalic acid and isophthalic acid and mixtures of said members, (2) from about 15 to 46 equivalent percent, and preferably from 25 to 40 equivalent percent, of ethylene glycol, and (3) from about 13 to 44 equivalent percent, and preferably from 20 to 32 equivalent percent, of a saturated aliphatic polyhydric alcohol having at least three hydroxyl groups. The preferred specific polyester resin of the present invention comprises the product of reaction of about 45 equivalent percent of dimethyl terephthalate, about 33 equivalent percent of ethylene glycol and about 22 equivalent percent of glycerin.

Among the lower dialkyl esters of terephthalic or isophthalic acids which may be used in the polyesters of the present invention are included, for example, those esters containing alkyl radicals having from 1 to 8 and preferably from 1 to 4 carbon atoms. These lower dialkyl esters include, for example, the dimethyl ester, the diethyl ester, the dipropyl ester, the dibutyl ester, etc.

The terms "polyhydric alcohol" and "saturated aliphatic polyhydric alcohol having at least three hydroxyl groups" as used in the present invention include both polyhydric alcohols in which the hydroxyl groups are connected by a plurality of carbon-carbon linkages as well as ether alcohols having at least three hydroxyl groups. Among the saturated aliphatic polyhydric alcohols having at least three hydroxyl groups within the scope of the present invention are included, for example, glycerin, 1,1,1-trimethylol ethane, 1,1,1-trimethylol propane, pentaerythritol, sorbitol, mannitol, diglycerol, dipentaerythritol, etc.

The term "functional group" as used in the present application is intended to refer to a carboxyl group (—COOH), an ester group (—COOR, where R is an alkyl), or a hydroxyl group (—OH). The term "equivalent" as used in the present application refers to the number of moles of a substance multiplied by the number of functional groups present in its structure. Thus, the number of equivalents of dimethyl terephthalate in a quantity of dimethyl terephthalate is the number of moles of dimethyl terephthalate present times two. The number of equivalents of glycerin present in a given quantity of glycerin is the number of moles of glycerin present in that quantity times three. The term "equivalent percent" as used in the present application refers to the number of equivalents of a particular reactant divided by the total number of equivalents of all reactants times one hundred. The compositions employed in the present invention are described in terms of equivalents instead of in terms of moles, since the ingredients which make up the polyester resins react equivalent for equivalent rather than mole for mole.

Polyester resins prepared from a mixture of ingredients having a composition range within the scope of this invention are completely satisfactory for use as magnet wire insulation and slot insulation at temperatures of at least 135° C. for continuous operation. The suitability of these enameled wires for the high temperature magnet wire application is indicated by the fact that these wires pass all of the tests described above. In addition, these polyester resins utilize relatively inexpensive raw materials, are soluble in inexpensive solvents, are curable at a rapid rate in a wire curing tower, and may be applied to various sizes, shapes, and compositions of conductors at a wide range of speeds and temperatures.

The abrasion resistance test and the flexibility test, mentioned above, are the two tests employed to determine the mechanical properties of a magnet wire. Abrasion resistance is a measure of the amount of abrasion an insulated electrical conductor will withstand before the insulating enamel is worn away from the conductor. Abrasion resistance is measured by rubbing the side of a round steel needle back and forth across the surface of an insulated electrical conductor until the enamel is worn away. The number of strokes required to wear the enamel away is referred to as the number of abrasion resistance strokes. For a complete description of the procedure followed in abrasion resistance testing where a needle is rubbed back and forth across the insulated electrical conductor, reference is made to NEMA Standard MW–24 which describes the procedure followed in the present invention. This NEMA Standard is incorporated by reference into the present application.

The flexibility of the enamel on a magnet wire is determined by stretching the enameled conductor and examining the stretched portion of the wire under a binocular microscope at a magnification of ten to determine if there are any imperfections on the surface of the enamel. The imperfections which may be noted on the surface of the enamel are a series of parallel surface lines or fissures which are perpendicular to the long axis of the wire. This condition of the enamel film is known as crazing. Another defect which can sometimes be observed is a break in the enamel film in which the two sections of the film are actually physically separated and the opening extends in depth to the exposed conductor. This defect is called a crack. A third defect which may be noted is a mar or blemish in the enamel film.

In the 25 percent elongation plus 3X flexibility test an insulated electrical conductor having a diameter X is elongated 25 percent and wound about a mandrel having a diameter 3X. If examination of the enamel under a magnification of ten shows none of the surface defects noted above, the insulation on the conductor passes this flexibility test. In some of the examples which follow, flexibility tests using elongations other than 25 percent and mandrels having a diameter other than 3X are employed. However, in all of these cases the flexibility test is as severe as the 25 percent elongation plus 3X flexibility test.

In order to determine whether a magnet wire will satisfactorily withstand the chemical stresses found in electrical applications, i.e., whether the enamel is resistant to the solvents commonly employed in varnishes which may be used as an overcoat for the enameled wires, solvent resistance tests are conducted. The solvent resistance test is the determination of the physical appearance of an enameled wire after immersion in a refluxing bath of a specified solution. Two solution systems are used for each sample of wire. Both of these solutions contain a mixture of alcohol and toluene. The alcoholic portion is composed of 100 parts by volume of U.S.P. ethanol and 5 parts by volume of C.P. methanol. One solvent test solution (which is designated as 50–50) consists of equal parts by volume of the above alcohol mixture and of toluene. The second solution (which is designated as 70–30) is 70 parts of the alcohol mixture and 30 parts of toluene.

In the usual operation of the test, about 250 ml. of the solution is placed in a 500 ml. round-bottomed, single-necked flask which is heated by a suitable electrical heating mantle. A reflux condenser is attached to the flask and the solution is maintained at reflux temperature. A sample is formed so that three or more straight lengths of the wire having cut ends can be inserted through the condenser into the boiling solvent. After five minutes the wire is removed and examined for blisters, swelling or softening. Any visible change in the surface constitutes a failure. Soft (requiring the thumbnail to remove it) but smooth and adherent enamel is considered to pass this five minute test. The samples are then returned to the solvent for another five minutes and re-examined for the same defects. If the enamel shows any blisters or swelling at the end of either the five minute or the ten minute test in the 70–30 solution (the 70–30 solvent resistance test) the enamel has failed the solvent resistance test. If the enamel shows any blisters or swelling at the end of the five minute test in the 50–50 mixture (the 50–50 solvent resistance test) the enamel has failed this solvent resistance test.

In order to determine whether the insulation on a magnet wire can withstand the electrical stresses encountered in electrical apparatus, the dielectric strength of the enamel film must be determined. The dielectric strength of the enamel film must be determined. The dielectric strength of an insulating film is the voltage required to pass a finite current through the film. In general, dielectric strength is measured by increasing the potential across the insulating film at a rate of 250 volts per second and taking the root mean square of the voltage at which the finite current flows through the film as the dielectric strength. Three types of samples are generally used for measuring dielectric strength. The first type comprises a serpentine loop of wire which is immersed in a conducting fluid to a depth of about one inch. A potential is then placed between the conductor and the conducting fluid to measure the dielectric strength. In general, the conducting fluid employed is mercury, and the result of the test is referred to as "dielectric strength, volts (or volts per mil), mercury immersion."

The second type of specimen employed to measure dielectric strength is a sample made up of two pieces of enameled wire which have been twisted together a specified number of times while held under a specific tension. A potential is then placed across the two conductors and the voltage is increased at the rate of 250 volts per second until a finite current flows through the insulation. The voltage determined by this method is referred to as "dielectric strength, volts (or volts per mil), twisted pair." The number of twists and the tension applied to the twisted wires is determined by the size of the bare conductor. A complete listing of the specifications for various wire sizes are described in the aforementioned NEMA Standard MW–24 and JAN-W–583.

The third type of specimen employed to measure dielectric strength is a sample made up of an enameled conductor with aluminum foil wrapped tightly around it. Again a potential is placed across the conductor and the foil and the voltage is increased at the rate of 250 volts per second until a finite current flows through the insulation. The voltage determined by this method is referred to as "dielectric strength, volts (or volts per mil), aluminum foil." For an enameled wire to be satisfactory for use in dynamoelectric machines such as motors and generators, it should have a dielectric strength of at least 2000 volts per mil, mercury immersion, twisted pair or aluminum foil.

In order to determine whether a magnet wire may be employed at high temperatures, it is necessary to measure properties of the enameled conductor at high temperatures. Among the properties which must be measured are the cut-through temperature of the enamel, the percent elongation of the enamel before cracking after heat aging at an elevated temperature, the heat shock characteristics of the enamel, the weight loss of the enamel in a sealed system, and the dielectric strength loss of the enamel when heated at high temperatures in air. Since it is well known that copper is one of the most economical conductors available, all of the thermal tests of magnet wire are conducted on copper magnet wire.

To determine whether the insulation on a magnet wire will flow when the wire is raised to an elevated temperature under compressive stress, the cut-through temperature of the enamel film is determined. This cut-through temperature is the temperature at which the enamel film separating two magnet wires, crossed at 90 degrees and supporting a given load on the upper wire, flows sufficiently to establish electrical contact between the two conductors. Since magnet wires in electrical apparatus may be under compression, it is important that the wires be resistant to softening by high temperature so as to prevent short circuits within the apparatus. The tests are conducted by placing two eight inch lengths of enameled wire prependicular to each other under a load of 1000 grams at the intersection of the two wires. A potential of 110 volts A.C. is applied to the end of each wire and a circuit which contains a suitable indicator such as a buzzer or neon lamp is established between the ends of the wires. The temperature of the crossed wires and the load is then increased at the rate of 3 degrees per minute until the enamel softens sufficiently so that the bare conductors come into contact with each other and cause the neon lamp or buzzer to operate. The temperature at which this circuit is established is measured by a thermocouple extending into a thermowell to a point directly under the crossed wires. The cut-through temperature is taken as the temperature in the thermowell at the moment when the current first flows through the crossed wires. Although this temperature is always somewhat lower than the true temperature of the wires, it gives a fairly accurate measurement of the cut-through temperature range of the enameled wire being tested. Magnet wires designed for operating temperatures of at least 135° C. should have a cut-through temperature of at least 175° C.

When measuring properties of an insulating film such as percent elongation after heat aging, heat shock, weight loss after heating in vacuum, and dielectric strength loss after heating in air, what is actually being measured is the effect of thermal degradation of the enamel on the particular properties being measured. The most straightforward method of measuring this thermal degradation of an enamel on a wire is to maintain the enameled wire at the temperature at which it is desired to operate the wire until decomposition takes place. However, this method is impractical in the evaluation of new materials because of the relatively long periods of time involved. Thus, it might be found that an enameled wire may operate successfully at a temperature of 135° C., for example, for five to ten years before any substantial thermal degradation takes place. Because it is obviously impractical to wait such a long period of time to find out whether a resin is satisfactory for magnet wire enamel, it is customary to conduct accelerated heat life tests on these enameled wires. Since thermodynamic theories show that the rate of a given reaction can be determined as a function of temperature, it is possible to select elevated temperatures for thermal tests of enamel films and to calculate the thermal properties of the enameled wire at the desired operating temperature from these accelerated test data. Although it might be expected that degradation reactions which occur at elevated test temperatures might not occur at temperatures at which the magnet wire is to be operated because of activation energies required to initiate certain reactions, experience has shown that accelerated heat life tests are an accurate method for determining the heat life of a material at operating temperatures.

In determining whether an enamel film will lose its flexibility after extended periods of time at operating temperature, it is customary to heat age a sample of the enameled wire for a short time and to then place a sample of the wire in a tensile tester and elongate the wire until either the conductor ruptures or a surface defect appears in the enamel. In practice it has been found that for a magnet wire to be satisfactory for use in dynamoelectric machines at temperatures of at least 135° C. the enameled film must stretch about 15 percent without any surface defect after heat aging for 100 hours in a circulating air oven maintained at a temperature of 185° C., or must stretch about 9 percent without any surface defect after heat aging for 24 hours in a circulating air oven maintained at a temperature of 225° C.

The effect of high temperatures on the flexibility of a magnet wire enamel may also be measured by winding a sample of the enameled wire having a conductor diameter X on a conical mandrel having an apex angle of about 20 degrees, removing the conical sameple of wire from the mandrel and placing it in a circulating air oven maintained at 175° C. After 10 minutes the conical sample of wire should show no surface defects in any of the windings formed on a portion of the cone having a diameter greater than 5X in order for the enameled wire to have sufficient flexibility for steady operation at at least 135° C. This test is known as the heat shock test.

One possible effect of high temperature on a magnet wire insulation is degradation of the relatively high molecular weight insulating material to low molecular weight material with subsequent evaporation of the low molecular weight portion. Since it is obvious that it would be unsatisfactory to operate a dynamoelectric machine containing magnet wire insulation which is slowly evaporating, it is necessary to measure the weight loss of an enameled film at high temperatures in an accelerated test. In a dynamoelectric machine the magnet wires are always given some type of varnish overcoat which protects the surface of the enamel from air oxidation. To approximate the conditions found in a dynamoelectric machine, samples of the enameled magnet wire are placed in long sealed tubes and heated at elevated temperatures for a weight loss measurement. In practice, it has been found that for operation at continuous temperatures of at least 135° C. the insulation on a magnet wire should not lose more than about three percent of its weight after 1000 hours in a sealed tube at a temperature of 200° C.

The final thermal requirement of a magnet wire which is to be used at elevated temperatures is that the dielectric strength of the enamel film remains sufficiently high at elevated temperatures after a long period of operation so that no short circuits occur between adjacent magnet wires. We have found that for a magnet wire to be satisfactory for operation at a temperature of at least 135° C. its dielectric strength should decrease by less than about 70 percent after being maintained at a temperature of 200° C. for 500 hours in an oven circulating air having a relative humidity of 25 percent at room temperature. This change in dielectric strength is measured as the dielectric strength, volts (or volts per mil) twisted pairs, both before and after the 200° C. heat aging.

Unexpectedly, we have found that polyester resins within the scope of the present invention are able to pass all of the tests described above when employed as magnet wire insulation. Therefore, these resins are satisfactory for use as insulation on electrical conductors which are to be used at temperatures of at least 135° C. When acids or derivatives of acids other than terephthalic acid or isophthalic acid are employed, or when glycols other than ethylene glycol are employed in the resins of the present invention, the resulting product is deficient in at least one of the several properties required for a high temperature insulating material. We have also found that when the ingredients of the polyester resins are used in concentration ranges outside of those of the present invention, the resulting resin is again deficient in at least one of the several properties required.

Resins may be prepared using any material or mixture of materials from each of the three groups of components of the polyester resins of the present invention, and any of the resulting resins are able to meet the physical, chemical, electrical and thermal properties which are required in magnet wire insulation operable at a temperature of at least 135° C. for indefinitie periods of time. In the case of the acid component of the resin, the use of a lower dialkyl ester of terephthalic acid produces enamels which can be applied to conductors at faster speeds and which have greater solvent resistance than resins prepared using a lower dialkyl ester of isophthalic acid. When enamels are prepared from isophthalic acid or its derivatives, there is less sublimation of the ingredients of the resin during the cooking and the resulting reaction product is more soluble in commercial solvents than is the case with enamels prepared from esters of terephthalic acids.

The polyhydric alcohols having at least three hydroxyl groups employed in the practice of the present invention differ from each other depending on both molecular weight and on the number of primary hydroxyl groups present. Since primary hydroxyl groups are more reactive than secondary or tertiary hydroxyl groups, enamels may be prepared and cured on wires under less severe conditions when more than two primary hydroxyl groups are present in the polyhydric alcohol than when only one or two primary hydroxyl groups are present. It has also been noted that polyhydric alcohols having only primary hydroxyl groups are resistant to higher temperatures than are those having secondary or tertiary hydroxyl groups in the structure. It has also been observed that the lower molecular weight polyhydric alcohols are more resistant to higher temperatures than are the higher molecular polyhydric alcohols. It has also been observed that polyhydric alcohols containing only primary hydroxyl groups form resins which have higher hydrolytic stability than resins formed from those having both primary and secondary hydroxyl groups. Thus, a polyester resin prepared from dimethyl terephthalate, ethylene glycol, and 1,1,1-trimethylol ethane, lost weight in flowing steam at 175° C. at a rate that was one-half to one-quarter lower than the rate of loss of weight of a polyester resin of a similar formulation in which glycerin was substituted for all of the 1,1,1-trimethylol ethane.

The synthetic polyester resins of the present invention may be formed in fairly conventional ways. Thus, the lower dialkyl ester of terephthalic acid and isophthalic acid, the ethylene glycol and the polyhydric alcohol are merely added to any suitable reaction vessel. This reaction vessel may be formed of any suitable material such as glass, stainless steel or any of the other metals commonly employed in processing polyester resins. Since the reaction involved in forming the polyester resins of the present invention is essentially an alcoholysis reaction, the net effect of the reaction is to substitute a polyhydric alcohol or a glycol for the lower alkyl radicals of the lower dialkyl isophthalates or terephthalates with the concurrent liberation of the lower alcohol. In the case of the dimethyl esters of the acids the alcohol which is liberated is methanol. Therefore, suitable means should be provided for eliminating the methanol or other lower alcohols liberated during the reaction period. In general, heat is applied to the reaction mixture and the lower alcohol liberated is either vented to the atmosphere or collected in a condenser system. Since the lower dialkyl esters of terephthalic acid have a tendency to sublime when heated too rapidly, it is desirable to provide means for condensing this sublimate while still allowing the lower alcohols to escape from the system. This may be accomplished by operating a condenser over the reaction vessel at a temperature suitable to condense the sublimate while allowing the lower alcohol vapors to escape.

Since alcoholysis reactions are rather slow when run without catalysts, we prefer to use alcoholysis catalysts when preparing the polyester resins of the present invention. Among the many alcoholysis catalysts which may be used are included, for example, lead oxides, lead acetate, zinc oxide, cadmium acetate, cuprous acetate, zinc acetate, magnesium acetate, beryllium acetate, stannic acetate, ferric acetate, nickel acetate, etc. The amount of catalyst employed is not critical and may vary over a wide range depending on the particular polyester system under consideration. In general, we employ from about 0.01 to about 5 percent, by weight, of the alcoholysis catalyst, based on the total weight of the dibasic acid compounds. Higher concentrations of such catalyst may be employed but no advantage is gained by such use. Preferably, we employ about 0.1 percent, by weight, of the metallic component of catalyst based on the total weight of the dibasic acid employed.

In preparing the polyester resins of the present invention we have found it desirable to heat the reactants to obtain as high a molecular weight material as possible without causing gelation of the resulting product. The reaction is accomplished by heating the reactants from room temperature to a temperature of about 200 to 270° C. over a period of from two to six hours. During the initial heating period it is sometimes found that sublimation of the lower dialkyl esters of the acids employed begin to occur. To prevent this sublimation, xylene or some similar material may be added to the reaction mixture to keep the lower dialkyl ester of the acid in solution. The xylene or other similar material takes no part in the reaction and is distilled from the reaction mixture during the course of the reaction. Any water which is present in the raw materials employed in the reaction is also distilled from the reaction mixture during the heating process. One source of moisture commonly found in the reaction mixture is the water which is dissolved in the higher polyol. Thus, U.S.P. glycerin contains about 5 percent, by weight, of dissolved water which azeotropically distills from the reaction mixture with xylene.

The alcoholysis catalyst may be added to the reaction mixture at the beginning of the heating period or after the reactants have been heated for a short length of time to remove any water present in the raw materials employed. After heating the reactants to the desired final temperature between about 200° and 270° C., the reaction may be stopped or the product may be maintained at the final temperature for another 2 to 4 hours to increase the molecular weight. When the product is maintained at this final temperature it is necessary to stop the reaction before the resin reaches such a high molecular weight that gelation occurs.

Instead of measuring the molecular weight of the polyester resin directly, we have found it convenient to measure the molecular weight in terms of a viscosity factor since it is known that the viscosity of a resin solution is related to the molecular weight of the resin. Specifically, we measure viscosity in terms of the logarithmic viscosity number. In determining this viscosity number 350 to 450 mg. of resin are placed in a 10 ml. volumetric flask which is then filled to the calibrated mark with 1,4-dioxane and stored over night in an oven maintained at 90° C. The solution is then transferred through a funnel into a size 50 Cannon-Fenske viscometer. This viscometer is placed in a water bath maintained at 60° C. and at least 15 minutes are allowed for the sample to come to temperature equilibrium. By means of suction the solution is then drawn above the upper reference mark in the viscometer and the time required for the meniscous to drop from the upper to the lower reference mark is measured with a stop watch. Each viscometer is calibrated by measuring the efflux time of 1,4-dioxane alone. The logarithmic viscosity number is then calculated from the formula below:

Logarithmic viscosity number $$= \frac{2.30 \log_{10} \left( \frac{\text{solution efflux time}}{\text{solvent efflux time}} \right)}{\text{grams solute/cc. solution}}$$

In general, we find that the polyester resins of the present invention are satisfactory when the logarithmic viscosity number of the final product is from about 3 to 25 and preferably from about 7 to 20 at the end of the reaction period. When the logarithmic viscosity number was greater than about 25, it was sometimes difficult to prevent gelation of the resin.

The reaction is generally terminated by pouring a suitable solvent into the hot polyester resin to form a solution having a solids content of about 30 to 50 percent, by weight. This solution is then filtered to remove any insoluble matter. Among the many solvents suitable for the polyester resins employed in the present invention may be mentioned m-cresol, xylenols, polyhydroxy benzenes, xylene and other polyalkyl benzenes, high boiling petroleum hydrocarbons, etc.

Instead of dissolving the polyester resins of the present invention in a solvent, it is sometimes desirable to use the resinous materials without a solvent being present. For these applications the resin is merely allowed to cool down to room temperature without the addition of any type of solvent. This results in a brittle solid mass which may be ground into a powder if desired for further use. Where the resin has been obtained in powder form and it is subsequently desired to use it in solution, the resin may be added to a suitable solvent and the mixture heated up to a temperature of about 100° C. until complete solution of the resin takes place.

When the polyester resins of the present invention are to be employed as magnet wire enamel, the resins are applied to the wires from solution by well-known methods, For optimum results we have found that solutions containing from about 20 to 30 percent resin solids should be employed. These solutions can be prepared by diluting higher concentration resin solutions with any of the resin solvents mentioned above.

The method of applying the resin to wire comprises passing the wire through the resin solution, through a suitable die, and then through an oven maintained at an elevated temperature to cure the resin on the wire. Where desired, the wire may be passed through the resin solution and a die a number of times and through the oven after each pass through the resin solution. This will provide a greater enamel build than is obtainable with only one pass through the resin solution. Although the die sizes are not critical we prefer to employ dies which provide a clearance of from two to four mils around the wire. The speed at which the wire is passed through the resin solution and the temperature at which the oven is maintained depend on the particular resin solution employed, the build of enamel desired, the length of the oven in which the coated wire is cured, and the molecular weight of the resin used in the coating operation. We have found that an enamel build on a 50.8 mil round copper wire of about 3 mils (diameter of enameled wire less diameter of bare wire) may be obtained by passing the wire through a solution containing 25 percent, by weight, of a suitable polyester resin and through a heating tower 18 feet long at speeds of from about 18 to 40 feet per minute when the temperature of the curing oven is maintained at from about 380° to 440° C. In general, the higher the wire speed, the higher is the optimum wire tower temperature. In the coating operation just described, the wire is generally passed through the resin solution and a wire tower six times to obtain the desired build.

In order to insure complete curing of the polyester resins of the present invention when applying them to conductors, it is desirable to employ a curing catalyst to accelerate the curing reaction in the resin solutions during the coating operation, although satisfactory results are obtained without the use of such a catalyst. Among the many curing catalysts suitable for this purpose may be mentioned zinc octoate, cadmium octoate, aromatic diisocyanates, aliphatic diisocyanates, etc. Where metal containing curing catalysts are employed we have obtained satisfactory results using from about 0.2 to 1.0 percent, by weight, of the metal element of the catalyst based on the total resin solids present in the solution. Where using the diisocyanate catalysts, we employ from about 0.01 to 2 percent, by weight, of the catalyst based on the total resin solids. Preferably, we use sufficient metal containing catalyst to give 0.5 percent metal based on the total resin solids and when using the diisocyanates we use 0.5 percent, by weight, of the diisocyanate based on the total resin solids present.

Where the polyester resins of this invention are to be employed as slot insulation in dynamoelectric machines, it is necessary to form cured sheets or films of the resins. This can be accomplished by any of the conventional film forming methods such as casting a solution of the resin and heating the casting to drive off the solvent and curing the resin. Films can also be formed by extruding viscous solutions of the resins into a heated chamber where curing takes place. Film formed from these resins are tough, flexible products having high dielectric strength, thermal stability at temperatures of at least 135° C. and a tensile strength of about 6000 p.s.i. These films may be used as slot insulation on dynamoelectric machines by lining the slots in armatures with the film and placing the insulated windings into the lined slots. These films can also be used as the dielectric material in capacitors and are particularly valuable for use in aluminum foil type capacitors.

It is seen that the polyester resins of the present invention are actually prepared in two steps. In the first step the reactants are cooked to a substantially linear polymeric form with the composition of the linear resin being essentially the same as the starting composition. This linear polymer is then further cured by the application of heat.

In the following illustrative examples the preparation and properties of a number of polyester resins of the present invention are described. Most of the examples describe the preparation of the resin and the wire speed and curing temperature employed in applying the resin to the conductor and the enamel build obtained. In all cases the resin is applied by passing the conductor through the resin solution, a suitable die, and an eighteen foot vertical curing oven or wire tower with six passes being employed to obtain the final build. After the last pass through the oven, the wires are cooled and wound on a reel. Samples taken from the reel are then tested for build, abrasion resistance, cut-through temperature, flexibility before heat aging, flexibility after heat aging on some of the samples, solvent resistance, dielectric strength, etc. In the case of abrasion resistance, the load on the needle was always that required by NEMA Standard MW–24. Generally this was a 780 gram load, since this is the load called for with 50.8 mil round copper wire having an enamel build of from 2.6 to 3.5 mils. In all of the examples where cresol is mentioned as a solvent, the cresol used was the U.S.P. variety comprising a mixture of isomeric cresols (primarily m-cresol) in which 90 percent of the mixture distills at 195 to 205° C. at atmospheric pressure and which has a specific gravity of 1.030–1.039 at 25° C. The glycerin used in the examples is 95 percent glycerin which contains about 5 percent moisture. The concentration of glycerin used in the examples is calculated on the basis of 100 percent glycerin.

In all of the following examples which relate to the preparation of resins and the application of these resins to electrical conductors, the resins formed were dissolved hot in cresol to a solids content of from 40 to 50 percent, by weight, of solids and after the addition of sufficient zinc octoate to give 0.5 percent zinc based on the weight of resin solids, this solution was further diluted with xylene to a solids content of from about 20 to 30 percent, by weight. All of the insulated electrical conductors prepared in these examples satisfactorily passed the 25 percent elongation plus 3X flexibility test and both the 70–30 and the 50–50 solvent resistance tests.

Examples 1 through 15 show the preparation of polyester resins within the scope of the present invention from various ratios of dimethyl terephthalate, ethylene glycol, and glycerin, with a solution of the resulting resin applied to electrical conductors.

*Example 1*

A polyester resin was prepared from the following ingredients:

| | Equiv. percent |
|---|---|
| Dimethyl terephthalate | 46 |
| Ethylene glycol | 31 |
| Glycerin (95%) | 23 |

These ingredients plus xylene were added to a three liter, three-necked flask, fitted with a thermometer, stirrer, and a five inch Vigreux column. A Dean and Stark trap and an addition funnel were attached to the top of the column and a nitrogen blanket was maintained on the system. The system heated for 30 minutes, during which time the temperature rose to about 130° C. and the water and xylene azeotropically distilled from the system. At this time about 0.03 percent lead acetate based on the weight of dimethyl terephthalate was added and the heating was continued for three and one-half more hours to a final temperature of about 240° C. Sufficient cresol was then added to the hot resin to form a solution having a solids content of 44.8 percent by weight. This solution remained clear after standing for over a month at room temperature. A portion of this solution was cut to a solids content of 25 percent with xylene after sufficient zinc octoate had been added to give 0.5 percent zinc based on total resin solids. This solution was then applied to 50.8 mil round copper wire under the conditions described in the table below to give enameled wires having the properties listed.

| Wire Speed, ft./min. | Curing Temp., °C. | Build, mils | Abrasion Resistance, Strokes | Cut-Through Temp., °C. | Percent Elongation After Heat Aging | |
|---|---|---|---|---|---|---|
| | | | | | 225° C. | 185° C. |
| 18 | 398 | 2.4 | 86+ | 250+ | | |
| 22 | 400 | 2.8 | 96+ | 255 | 12 | 39+ |
| 26 | 400 | 3.0 | 95+ | 250+ | | |
| 30 | 401 | 2.9 | 79+ | 245 | 17 | 36+ |
| 35 | 431 | 3.0 | 94+ | 200 | 19 | 36+ |
| 40 | 431 | 3.2 | 87+ | 245 | | |

A series of wires which had been coated with a polyester resin having the same formulation as the resin described above were tested for dielectric strength and were found to have a strength of more than 2500 volts per mil, twisted pair and mercury immersion. The resin weight loss of similar wires was only 2.5 percent after heating for 1000 hours in a sealed tube at 200° C. The loss in dielectric strength of similar wires was about 60 percent when heat aged for 500 hours at 200° C. in an air circulating oven having a room temperature relative humidity of 25 percent.

*Example 2*

Following the procedure of Example 1, a polyester resin was prepared from the following ingredients:

Equiv. percent
Dimethyl terephthalate _____ 50
Ethylene glycol _____ 25
Glycerin (95%) _____ 25

A 30 percent, by weight, solution of this resin was applied to 50.8 mil round copper wire under the conditions described in the table below.

| Wire Speed, ft./min. | Curing Temp., °C. | Build, mils | Abrasion Resistance, Strokes | Cut-Through Temp., °C. | Percent Elongation After Heat Aging, 185° C. |
|---|---|---|---|---|---|
| 22 | 401 | 2.9 | 95+ | 290 | |
| 26 | 401 | 3.8 | 97+ | 250 | |
| 30 | 400 | 3.5 | 47 | | |
| 35 | 433 | 3.4 | 55 | | 33 |
| 40 | 433 | 3.7 | | | |

*Example 3*

By the method of Example 1 a resin was prepared from the following ingredients:

Equiv. percent
Dimethyl terephthalate _____ 46
Ethylene glycol _____ 26
Glycerin (95%) _____ 28

Sufficient cresol was added to the reaction mixture to form a solution having a solids content of 44.3 percent. After 3 months this material showed no sign of precipitation of the resin on standing at room temperature. A portion of this material was diluted to a solids content of 30 percent, by weight, with xylene after the addition of sufficient zinc octoate to give 0.5 percent zinc based on the total resin solids and the material was applied to 50.8 mil round copper wire. The details of the coating procedure and the properties of the wires are listed in the table below.

| Wire Speed, ft./min. | Curing Temp., °C. | Build, mils | Abrasion Resistance, Strokes | Cut-Through Temp., °C. | Percent Elongation After Heat Aging, 225° C. |
|---|---|---|---|---|---|
| 18 | 400 | 2.5 | 56+ | 270+ | |
| 22 | 402 | 2.8 | 76+ | 270 | 19 |
| 26 | 401 | 3.1 | 84+ | 270 | |
| 30 | 401 | 3.0 | 66+ | 260 | 13 |
| 35 | 433 | 3.3 | 88+ | | 14 |
| 40 | 432 | 3.6 | 48+ | | |

*Example 4*

Following the method of Example 1 a polyester resin was prepared from the following:

Equiv. percent
Dimethyl terephthalate _____ 45
Ethylene glycol _____ 22
Glycerin (95%) _____ 33

Round 50.8 mil copper wire was then coated with a 30 weight percent solution of this resin under the conditions described in the table below to give the properties listed in the table.

| Wire Speed, ft./min. | Curing Temp., °C. | Build, mils | Abrasion Resistance, Strokes | Cut-Through Temp., °C. | Percent Elongation After Heat Aging, 185° C. |
|---|---|---|---|---|---|
| 18 | 400 | 2.7 | 89+ | 255 | |
| 22 | 399 | 3.4 | 100+ | | 37+ |
| 26 | 399 | 3.6 | 94+ | | |
| 30 | 399 | 3.3 | 98+ | | 34 |
| 35 | 433 | 3.3 | 95+ | 270+ | 36+ |
| 40 | 433 | 2.9 | 92+ | 280 | |

*Example 5*

A polyester resin was prepared from the following:

Equiv. percent
Dimethyl terephthalate _____ 46
Ethylene glycol _____ 17
Glycerin (95%) _____ 37

These ingredients plus xylene and 0.017 percent lead acetate. $3H_2O$ based on the weight of the dimethyl terephthalate were heated from room temperature to a final temperature of about 240° C. over a period of about 5 hours. At this time sufficient cresol was added to the hot resin to form a solution containing about 40 percent, by weight, of solids. After about one month's standing at room temperature this solution had shown no sign of precipitation or cloudiness. Sufficient zinc octoate was added to this solution to give 0.5 percent zinc based on resin solids and the solution was thinned with xylene to form a solution containing 25 percent solids. A 50.8 mil round copper wire was coated with this resin solution under the conditions described in the table below to give the listed properties.

| Wire Speed, ft./min. | Curing Temp., °C. | Build, mils | Abrasion Resistance, Strokes | Cut-Through Temp., °C. | Percent Elongation After Heat Aging, 185° C. |
|---|---|---|---|---|---|
| 18 | 400 | 2.1 | 73 | 270+ | |
| 22 | 401 | 2.7 | 88+ | 275+ | 31 |
| 26 | 401 | 3.0 | 89+ | 265+ | |
| 30 | 401 | 3.0 | 85 | 250+ | 25 |
| 35 | 430 | 3.0 | 87+ | 250+ | 19 |
| 40 | 431 | 3.1 | 56 | 250+ | |

*Example 6*

A polyester resin was prepared by the method of Example 5 from the following ingredients:

Equiv. percent
Dimethyl terephthalate _____ 50
Ethylene glycol _____ 15
Glycerin (95%) _____ 35

A 50.8 mil round copper wire was coated with a 25 percent solution of this resin as described in the following table.

| Wire Speed, ft./min. | Curing Temp., °C. | Build, mils | Abrasion Resistance, Strokes | Cut-Through Temp., °C. | Percent Elongation After Heat Aging, 185° C. |
|---|---|---|---|---|---|
| 18 | 400 | 2.0 | 79 | 250+ | |
| 22 | 401 | 2.4 | 92 | 250+ | 30 |
| 26 | 401 | 2.2 | 75 | 270+ | |
| 30 | 401 | 2.7 | 76 | 270+ | 17 |
| 35 | 430 | 2.8 | 95+ | 280+ | 15 |
| 40 | 430 | 3.0 | 91+ | 280+ | |

*Example 7*

A polyester resin was prepared by the method of Example 5 from the following ingredients:

Equiv. percent
Dimethyl terephthalate _____ 37
Ethylene glycol _____ 19
Glycerin (95%) _____ 44

A 25 percent solution of this resin was applied to 50.8 mil round copper wire under the conditions described in the table below and to give an enamel having the properties described in the table below.

| Wire Speed, ft./min. | Curing Temp., °C. | Build, mils | Abrasion Resistance, Strokes | Cut-Through Temp., °C. | Percent Elongation After Heat Aging, 185° C. |
|---|---|---|---|---|---|
| 22 | 402 | 2.6 | 97+ | 265+ | 24 |
| 26 | 403 | 2.9 | 96+ | 270+ | |
| 30 | 403 | 3.2 | 96+ | 270+ | 15 |
| 35 | 438 | 2.9 | 100+ | 250+ | 23 |
| 40 | 437 | 3.2 | 87+ | 270+ | |

*Example 8*

A polyester resin was prepared by the method of Example 5 using the following ingredients:

Equiv. percent
Dimethyl terephthalate _____ 37
Ethylene glycol _____ 32
Glycerin (95%) _____ 31

A 50.8 mil round copper wire was then coated with a 25 percent solution of this resin under the conditions listed in the table below to form an enameled wire having the properties listed in the table below.

| Wire Speed, ft./min. | Curing Temp., °C. | Build, mils | Abrasion Resistance, Strokes | Cut-Through Temp., °C. | Percent Elongation After Heat Aging, 185° C. |
|---|---|---|---|---|---|
| 18 | 400 | 2.8 | 94+ | 210 | |
| 22 | 401 | 2.9 | 90+ | 235 | 38+ |
| 26 | 401 | 3.2 | 100+ | 250+ | |
| 30 | 403 | 3.3 | 96+ | 250+ | 38+ |
| 35 | 436 | 3.0 | 99+ | 250+ | 36+ |
| 40 | 434 | 2.9 | 100+ | 250+ | |

*Example 9*

A polyester resin was prepared by the method of Example 5 from the following ingredients:

Equiv. percent
Dimethyl terephthalate _____ 25
Ethylene glycol _____ 38
Glycerin (95%) _____ 37

A 50.8 mil round copper wire was coated with a 25 percent solution of this resin under the conditions described in the table below to give an enameled wire having the properties listed.

| Wire Speed, ft./min. | Curing Temp., °C. | Build, mils | Abrasion Resistance, Strokes | Cut-Through Temp., °C. | Percent Elongation After Heat Aging, 185° C. |
|---|---|---|---|---|---|
| 18 | 396 | 2.3 | 98+ | 260 | |
| 22 | 396 | 2.6 | 93+ | 260+ | 34+ |
| 26 | 397 | 2.6 | 91+ | 250+ | |
| 30 | 399 | 2.6 | 64 | 260+ | 34+ |
| 35 | 390 | 2.5 | 70+ | 250+ | 38+ |
| 40 | 390 | 2.7 | 95+ | 250 | |

*Example 10*

A polyester resin was prepared by the method of Example 5 from the following ingredients:

Equiv. percent
Dimethyl terephthalate _____ 36
Ethylene glycol _____ 46
Glycerin (95%) _____ 18

A 30 percent solution of this resin was applied to a 50.8 mil round copper wire and cured. The following table shows the coating conditions employed and the properties of the material after curing.

| Wire Speed, ft./min. | Curing Temp., °C. | Build, mils | Abrasion Resistance, Strokes | Cut-Through Temp., °C. | Percent Elongation After Heat Aging, 185° C. |
|---|---|---|---|---|---|
| 18 | 399 | 2.6 | 42 | 210 | |
| 22 | 400 | 3.0 | 56 | 220 | 38+ |
| 26 | 401 | 3.1 | 57 | 205 | |
| 30 | 401 | 3.4 | 48 | 220 | 40+ |
| 35 | 432 | 3.2 | 56 | 220 | 39+ |

*Example 11*

A polyester resin was prepared by the method of Example 5 from the following:

Equiv. percent
Dimethyl terephthalate _____ 46
Ethylene glycol _____ 39
Glycerin (95%) _____ 15

A 50.8 mil round copper wire was coated with a 25 percent solution of this resin under the conditions described in the table below to give enameled wires having the properties listed.

| Wire Speed, ft./min. | Curing Temp., °C. | Build, mils | Abrasion Resistance, Strokes | Cut-Through Temp., °C. | Percent Elongation After Heat Aging, 185° C. |
|---|---|---|---|---|---|
| 18 | 400 | 2.6 | 63+ | 220+ | |
| 22 | 400 | 2.8 | 61+ | 230 | 39+ |
| 26 | 400 | 3.3 | 54 | 210 | |
| 30 | 402 | 3.3 | 56 | 255+ | 39+ |
| 35 | 432 | 3.2 | 34 | 190 | 39+ |

*Example 12*

A resin was prepared by the method of Example 5 from the following:

Equiv. percent
Dimethyl terephthalate _____ 50
Ethylene glycol _____ 36
Glycerin (95%) _____ 14

A 50.8 mil round copper wire was coated with a 25 percent solution of this resin under the conditions described below to give an enameled wire having the properties listed.

| Wire Speed, ft./min. | Curing Temp., °C. | Build, mils | Abrasion Resistance, Strokes | Cut-Through Temp., °C. | Percent Elongation After Heat Aging, 185° C. |
|---|---|---|---|---|---|
| 22 | 402 | 2.3 | 64 | 185 | 40+ |
| 26 | 402 | 2.5 | 44 | 190 | |

Example 13

A polyester resin was prepared by the method of Example 5 from the following ingredients:

| | Equiv. percent |
|---|---|
| Dimethyl terephthalate | 52 |
| Ethylene glycol | 35 |
| Glycerin (95%) | 13 |

A 25 percent solution of this resin was coated on 50.8 mil round copper wire as described in the table below to give the properties listed.

| Wire Speed, ft./min. | Curing Temp., °C. | Build, mils | Abrasion Resistance, Strokes | Cut-Through Temp., °C. | Percent Elongation After Heat Aging, 185° C. |
|---|---|---|---|---|---|
| 18 | 400 | 2.2 | 54 | 245 | |
| 22 | 401 | 2.7 | 62 | 195 | |
| 26 | 401 | 2.9 | 44 | 175 | 40+ |

Example 14

A polyester resin was prepared by the method of Example 5 from the following ingredients:

| | Equiv. percent |
|---|---|
| Dimethyl terephthalate | 56 |
| Ethylene glycol | 22 |
| Glycerin (95%) | 22 |

A 25 percent solids content solution of this resin was applied to a 50.8 mil round copper wire under the conditions described in the table below to give wires with the properties listed.

| Wire Speed, ft./min. | Curing Temp., °C. | Build, mils | Abrasion Resistance, Strokes | Cut-Through Temp., °C. | Percent Elongation After Heat Aging, 185° C. |
|---|---|---|---|---|---|
| 18 | 399 | 1.6 | 92+ | 250+ | |
| 22 | 400 | 2.2 | 100+ | 250+ | 36+ |
| 26 | 400 | 2.6 | 93+ | 250+ | |
| 30 | 400 | 3.0 | 43 | 180 | 20 |
| 35 | 430 | 2.1 | 70 | 175 | 23 |

Example 15

By the general procedure of Example 1 the preferred specific polyester resin of the present invention was prepared from the following ingredients:

| | Equiv. percent |
|---|---|
| Dimethyl terephthalate | 45 |
| Ethylene glycol | 33 |
| Glycerin (95%) | 22 |

A 25 percent solution of this resin was applied to 50.8 mil round copper wire under the conditions described in the table below to form a product with the properties listed.

| Wire Speed, ft./min. | Curing Temp., °C. | Build, mils | Abrasion Resistance, Strokes | Cut-Through Temp., °C. | Percent Elongation After Heat Aging, 225° C. |
|---|---|---|---|---|---|
| 27 | 400 | 3.3 | 75 | 245+ | 33+ |

Examples 16 through 20 which follow show the preparation of a series of resins from 30 equivalent percent ethylene glycol, 23 equivalent percent glycerin, and 46 equivalent percent of either dimethyl isophthalate or mixtures of dimethyl isophthalate and dimethyl terephthalate. The procedure followed in these examples is that of Example 1 with azeotropic distillation of the moisture and xylene and addition of the catalyst, litharge or lead acetate.3H$_2$O after this distillation.

Example 16

A polyester resin was prepared from the following ingredients:

| | Equiv. percent |
|---|---|
| Dimethyl isophthalate | 2.3 |
| Dimethyl terephthalate | 43.7 |
| Ethylene glycol | 31 |
| Glycerin (95%) | 23 |

A 30 percent solution of this resin was applied to 50.8 mil round copper wire under the conditions described in the table below to give wires having the properties listed.

| Wire Speed, ft./min. | Curing Temp., °C. | Build, mils | Abrasion Resistance, Strokes | Cut-Through Temp., °C. | Percent Elongation After Heat Aging, 225° C. |
|---|---|---|---|---|---|
| 22 | 400 | 3.5 | 100+ | 230 | 29 |
| 26 | 400 | 3.2 | 85+ | 260 | |
| 30 | 401 | 3.6 | 86+ | 210 | 15 |
| 35 | 432 | 3.5 | 85+ | 250 | |

Example 17

A polyester resin was prepared from the following ingredients:

| | Equiv. percent |
|---|---|
| Dimethyl isophthalate | 5.8 |
| Dimethyl terephthalate | 40.2 |
| Ethylene glycol | 31 |
| Glycerin (95%) | 23 |

This material was applied from a 30 percent solution to 50.8 mil round copper wire under the conditions described in the table below to give enameled magnet wires having the properties listed.

| Wire Speed, ft./min. | Curing Temp., °C. | Build, mils | Abrasion Resistance, Strokes | Cut-Through Temp., °C. | Percent Elongation After Heat Aging, 225° C. |
|---|---|---|---|---|---|
| 18 | 395 | 2.8 | 74 | 240 | |
| 22 | 400 | 2.9 | 100+ | 246 | 24 |
| 26 | 400 | 3.1 | 98+ | 260 | |
| 30 | 400 | 3.4 | 93+ | 245 | 29 |
| 35 | 433 | 3.2 | 93+ | 235 | 18 |

Example 18

A polyester resin was prepared from the following ingredients:

| | Equiv. percent |
|---|---|
| Dimethyl isophthalate | 9.8 |
| Dimethyl terephthalate | 36.2 |
| Ethylene glycol | 31 |
| Glycerin (95%) | 23 |

A 30 percent solution of this resin was applied to 50.8 mil round copper wire under the conditions described in the table below to give enameled wires having the properties listed.

| Wire Speed, ft./min. | Curing Temp., °C. | Build, mils | Abrasion Resistance, Strokes | Cut-Through Temp., °C. | Percent Elongation After Heat Aging, 225° C. |
|---|---|---|---|---|---|
| 18 | 400 | 2.5 | 71 | 245 | |
| 22 | 397 | 3.4 | 97+ | 215 | 32 |
| 26 | 401 | 3.2 | 98+ | 240 | |
| 30 | 401 | 3.3 | 65 | 225 | 18 |
| 35 | 434 | 3.4 | 88 | 185 | 22 |

Example 19

A polyester resin was prepared from the following ingredients:

|  | Equiv. percent |
|---|---|
| Dimethyl isophthalate | 23 |
| Dimethyl terephthalate | 23 |
| Ethylene glycol | 31 |
| Glycerin (95%) | 23 |

A 25 percent, by weight, solution of this resin was applied to 50.8 mil round copper wire under the conditions described in the table below to give enameled wires having the properties listed.

| Wire Speed, ft./min. | Curing Temp., °C. | Build, mils | Abrasion Resistance, Strokes | Cut-Through Temp., °C. | Percent Elongation After Heat Aging | |
|---|---|---|---|---|---|---|
|  |  |  |  |  | 185° C. | 225° C. |
| 26 | 400 | 2.8 | 83+ | 240 |  |  |
| 30 | 400 | 2.8 | 84+ | 190 | 38+ | 39+ |
| 35 | 400 | 2.8 | 59 | 205 | 38+ | 39+ |
| 40 | 400 | 3.1 | 67 | 215 |  |  |

Example 20

A polyester resin was prepared from the following ingredients:

|  | Equiv. percent |
|---|---|
| Dimethyl isophthalate | 46 |
| Ethylene glycol | 31 |
| Glycerin (95%) | 23 |

A 25 percent solution of this resin was applied to 50.8 mil round copper wire under the conditions described below to give enameled magnet wires having the properties listed.

| Wire Speed, ft./min. | Curing Temp., °C. | Build, mils | Abrasion Resistance, Strokes | Cut-Through Temp., °C. | Percent Elongation After Heat Aging, 225° C. |
|---|---|---|---|---|---|
| 18 | 396 | 1.9 | 51 | 240 |  |
| 22 | 397 | 2.4 | 79+ | 235 | 27+ |
| 26 | 398 | 2.7 | 70 | 200 |  |
| 30 | 400 | 2.8 | 64 | 230 | 37+ |

Example 21

This example describes the preparation and properties of a resin using the dibutyl ester of terephthalic acid. This resin was prepared by the method of Example 5 from the following ingredients:

|  | Equiv. percent |
|---|---|
| Dibutyl terephthalate | 46 |
| Ethylene glycol | 31 |
| Glycerin (95%) | 23 |

A 25 percent solution of this resin was applied to a 50.8 mil round copper wire under the conditions described in the table below to give a material having the properties also described in this table.

| Wire Speed, ft./min. | Curing Temp., °C. | Build, mils | Abrasion Resistance, Strokes | Cut-Through Temp., °C. | Percent Elongation After Heat Aging, 185° C. |
|---|---|---|---|---|---|
| 18 | 397 | 1.3 | 61+ | 260 |  |
| 22 | 398 | 1.9 | 65 | 270+ | 37+ |
| 26 | 399 | 2.0 | 35 | 215 |  |
| 35 | 430 | 2.4 | 39 | 175 | 37+ |

Examples 22 to 28, which follow, show the preparation of polyester resins using dimethyl terephthalate, ethylene glycol and polyhydric alcohols other than glycerin, and the application of these resins to electrical conductors.

Example 22

A polyester resin was prepared by the method of Exampel 5 from the following ingredients:

|  | Equiv. percent |
|---|---|
| Dimethyl terephthalate | 40 |
| Ethylene glycol | 40 |
| 1,1,1-trimethylol ethane | 20 |

A 30 percent solution of this resin was applied to 38.0 mil round copper wire under the conditions described in the table below to form an enameled wire having the properties also described in the table.

| Wire Speed, ft./min. | Curing Temp., °C. | Build, mils | Abrasion Resistance, Strokes | Cut-Through Temp., °C. | Percent Elongation After Heat Aging, 185° C. |
|---|---|---|---|---|---|
| 27 | 398 | 2.7 | 100+ | 270+ |  |
| 32 | 399 | 3.1 | 100+ | 250+ |  |
| 36 | 400 | 2.7 | 96+ | 250+ |  |
| 40 | 400 | 3.0 |  |  | 37+ |
| 47 | 431 | 3.1 | 100+ | 265+ |  |
| 53.5 | 432 | 2.8 | 100+ |  |  |

Example 23

A polyester resin was prepared by the method of Example 5 from the following ingredients:

|  | Equiv. percent |
|---|---|
| Dimethyl terephthalate | 37 |
| Ethylene glycol | 36 |
| 1,1,1-trimethylol ethane | 27 |

A 25 percent solution of this resin was applied to 50.8 mil round copper wire under the conditions described in the table below.

| Wire Speed, ft./min. | Curing Temp., °C. | Build, mils | Abrasion Resistance, Strokes | Cut-Through Temp., °C. | Percent Elongation After Heat Aging, 225° C. |
|---|---|---|---|---|---|
| 18 | 395 | 2.7 | 100+ |  |  |
| 22 | 394 | 3.0 | 99+ | 250+ | 10 |
| 26 | 396 | 3.0 | 100+ |  |  |
| 30 | 397 | 3.0 | 93+ | 250+ | 22 |
| 35 | 430 | 2.9 | 100+ | 250+ | 24 |
| 40 | 430 | 3.0 | 94+ |  |  |

Example 24

Following the procedure of Example 5 a polyester resin was prepared from the following ingredients:

|  | Equiv. percent |
|---|---|
| Dimethyl terephthalate | 46 |
| Ethylene glycol | 31 |
| 1,1,1-trimethylol propane | 23 |

A 25 percent solution fo this resin was applied to 50.8 mil round copper wire under the conditions described in the table below.

| Wire Speed, ft./min. | Curing Temp., °C. | Build, mils | Abrasion Resistance, Strokes | Cut-Through Temp., °C. | Percent Elongation After Heat Aging, 225° C. |
|---|---|---|---|---|---|
| 18 | 394 | 2.9 | 89+ |  |  |
| 22 | 400 | 2.8 | 95+ | 280+ | 12 |
| 26 | 402 | 3.3 | 100+ |  |  |

Example 25

A polyester resin was prepared by the method of Example 1 using the following ingredients:

|  | Equiv. percent |
|---|---|
| Dimethyl terephthalate | 46 |
| Ethylene glycol | 39 |
| Pentaerythritol | 15 |

The table below lists the conditions employed in applying a 25 percent solution of this resin to a 50.8 mil round copper wire and also gives the properties of the enamels formed.

| Wire Speed, ft./min. | Curing Temp., °C. | Build, mils | Abrasion Resistance, Strokes | Cut-Through Temp., °C. | Percent Elongation After Heat Aging, 185° C. |
|---|---|---|---|---|---|
| 26 | 398 | 3.0 | 100+ | 270+ | |
| 30 | 400 | 3.2 | 76 | 270+ | |
| 35 | 428 | 3.1 | 80+ | 260+ | 34 |
| 40 | 430 | 3.0 | 68+ | 260+ | 35 |

Example 26

By the method of Example 1, a polyester resin containing a mixture of polyhydric alcohols was prepared using the following ingredients:

| | Equiv. percent |
|---|---|
| Dimethyl terephthalate | 46 |
| Ethylene glycol | 31 |
| Glycerin (95%) | 20.7 |
| Diglycerol | 2.3 |

A 25 percent solution of this resin was applied to 50.8 mil round copper wire under the conditions listed in the table below to give enameled wires having the properties listed in this table.

| Wire Speed, ft./min. | Curing Temp., °C. | Build, mils | Abrasion Resistance, Strokes | Cut-Through Temp., °C. | Percent Elongation After Heat Aging, 185° C. |
|---|---|---|---|---|---|
| 22 | 400 | 3.0 | 67 | 220 | 37+ |
| 26 | 402 | 3.2 | 94+ | 250 | |
| 30 | 402 | 3.3 | 83+ | 245 | |
| 35 | 431 | 3.5 | 87+ | 250 | 37+ |
| 40 | 431 | 3.1 | 60 | 250 | |

Example 27

Following the procedure of Example 1, another resin containing a mixture of polyhydric alcohols was prepared from the following ingredients:

| | Equiv. percent |
|---|---|
| Dimethyl terephthalate | 43 |
| Ethylene glycol | 29 |
| Glycerin (95%) | 4 |
| Diglycerol | 24 |

The table below indicates the conditions used in applying a 25 percent solution of this resin to 50.8 mil round copper wire and the properties of the resulting enameled wires.

| Wire Speed, ft./min. | Curing Temp., °C. | Build, mils | Abrasion Resistance, Strokes | Cut-Through Temp., °C. | Percent Elongation After Heat Aging, 185° C. |
|---|---|---|---|---|---|
| 22 | 400 | 3.0 | 75 | 260 | 27 |
| 26 | 400 | 3.0 | 90+ | 260 | |
| 30 | 400 | 3.1 | 82 | 260+ | 24 |
| 35 | 430 | 2.7 | 57 | 260 | 24 |
| 40 | 430 | 3.4 | 58 | 260 | |

Example 28

A polyester resin was prepared by the method of Example 1 from the following ingredients:

| | Equiv. percent |
|---|---|
| Dimethyl terephthalate | 37.5 |
| Ethylene glycol | 37.5 |
| Sorbitol | 25.0 |

A 25 percent solution of this resin was applied to 50.8 mil round copper wire under the conditions described in the table below. This table also shows the physical properties of the resulting enameled wires.

| Wire Speed, ft./min. | Curing Temp., °C. | Build, mils | Abrasion Resistance, Strokes | Cut-Through Temp., °C. | Percent Elongation After Heat Aging, 185° C. |
|---|---|---|---|---|---|
| 22 | 400 | 2.4 | 81+ | 275+ | 27 |
| 26 | 400 | 2.7 | 71 | 230+ | |
| 30 | 401 | 2.9 | 58 | 235+ | 16 |
| 35 | 433 | 2.8 | 94+ | 240 | 19 |
| 40 | 434 | 3.0 | 51 | 205 | |

Example 29

In order to show the versatility of the polyester resins of the present invention with regard to their applicability to various sizes of conductors, different sized magnet wires were prepared and evaluated. A polyester resin was prepared from ingredients in the ratio of 46 equivalent percent dimethyl terephthalate, 31 equivalent percent ethylene glycol and 23 equivalent percent glycerin (95%). The table below lists the conditions employed in applying a 25 percent solution of this resin to various conductors. The table also lists properties of the resulting enameled wire.

| Wire size, mils | Wire Speed, ft./min. | Curing Temp., °C. | Build, mils | Abrasion Resistance, Strokes | Abrasion Load, Grams | Cut-Through Temp., °C. | Percent Elongation After Heat Aging, 225° C. |
|---|---|---|---|---|---|---|---|
| 25.0 | 54 | 400 | 2.84 | 34 | 640 | 200 | 24 |
| 40.3 | 34 | 400 | 2.90 | 61 | 700 | 250 | 20 |
| 50.8 | 27 | 400 | 3.3 | 72 | 780 | 255 | |
| 64.4 | 21 | 400 | 3.10 | 67 | 880 | 255 | 19 |

Example 30

In order to demonstrate the wide range of curing temperatures which may be employed with the polyester resins of the present invention, a series of enameled wires were prepared from the resin solution described in Example 29 using various curing temperatures and various speeds with 50.8 mil round copper wire. The table below shows the conditions employed in applying this enamel to the conductors and the physical properties of the resulting magnet wires.

| Wire Speed, ft./min. | Curing Temp., °C. | Build, mils | Abrasion Resistance, Strokes | Cut-Through Temp., °C. | Percent Elongation After Heat Aging, 225° C. |
|---|---|---|---|---|---|
| 12 | 300 | 3.28 | 80+ | 270 | |
| 15 | 300 | 3.16 | 58+ | 265 | |
| 12 | 320 | 2.98 | 86+ | 250+ | 21 |
| 15 | 320 | 2.98 | 97+ | 270+ | 24 |
| 18 | 320 | 3.10 | 72 | 250 | 25 |
| 15 | 340 | 3.24 | 87+ | 260 | 20 |
| 18 | 340 | 2.52 | 63 | 250 | 11 |
| 21 | 340 | 3.10 | 52 | 240 | 13 |
| 18 | 360 | 2.96 | 86+ | 255 | 11 |
| 21 | 360 | 3.22 | 94+ | 260 | 14 |
| 24 | 360 | 3.42 | 84 | 240 | 17 |
| 21 | 380 | 2.82 | 95+ | 260 | 15 |
| 24 | 380 | 3.12 | 83 | 245 | 15 |
| 27 | 380 | 3.16 | 64 | 245 | 16 |
| 27 | 400 | 3.02 | 82 | 250+ | 17 |
| 30 | 400 | 3.16 | 76 | 250 | 16 |
| 27 | 420 | 2.94 | 93+ | 240 | 17 |
| 30 | 420 | 3.06 | 97+ | 240 | 17 |
| 33 | 420 | 3.40 | 61 | 225 | 11 |

Example 31

A polyester resin was prepared having the same ratio of ingredients as shown in Example 29 and diluted to 37 percent, by weight, of solids with cresol. This resulting solution was further diluted to a solids content of 25 percent, by weight, by the addition of equal parts of Solvesso 100 and Solvesso 150 (high boiling petroleum hydrocarbon fractions). Solvesso 100 is a mixture of mono-, di-, and trialkyl (primary methyl) benzenes having a flash point of 105° F. and a distillation range of 152° to 185° C. Solvesso 150 is a mixture of di-, tri-, and tetraalkyl (primary methyl) benzenes having a flash point of 145° F. and a distillation range of 180° to 220° C. To this 25 percent solution was added sufficient zinc octoate to give 0.5 percent zinc based on total resin solids. This solution was applied to both 50.8 mil round aluminum wire and 50.8 mil round nickel-plated copper wire. The table below indicates the build obtained in the coating operation, the flexibility of the enamel coating after a 20 or 25 percent elongation and winding on a 1X mandrel, the abrasion resistance, the solvent resistance, the twisted pairs dielectric strength, the mercury immersion dielectric strength, the cut-through temperature under a 1000 gram load, and the heat shock observed on prewound samples of the conductor after 10 minutes at 175° C.

|  | Aluminum | Nickel-plated Copper |
|---|---|---|
| Build, mils | 3.1 | 3.0 |
| Flexibility: | | |
| 20%+1X | No cracks | |
| 25%+1X | | No cracks. |
| Abrasion Resistance, Strokes | 95 | 90. |
| 70-30 Solvent Resistance | OK | OK. |
| Dielectric Strength, Twisted Pairs, Volts | 12,000 | 13,000. |
| Dielectric Strength, Mercury Immersion, Volts | 6,000 | 6,000. |
| Cut-Through Temperature, °C | 265+ | 210. |
| Heat Shock Prewound 10 min. @ 175° C.: | | |
| 5X | OK | |
| 3X | | OK. |

Example 32

This example illustrates the versatility of the resins of the present invention with regard to their applicability to different shapes of conductors by showing the properties of a rectangular wire coated with one of these resins. A resin prepared from 46 equivalent percent dimethyl terephthalate, 31 equivalent percent ethylene glycol and 23 equivalent percent glycerin was applied to two rectangular copper conductors. The table below lists the initial size of the conductors, the enamel build obtained, the flexibility before and after heat aging in terms of the percent elongation of the enameled conductor at which defects appeared, the 50-50 solvent resistance, the mercury immersion dielectric strength and the aluminum foil dielectric strength measured by placing a potential between the conductor and aluminum foil wrapped around the conductor.

| Property | Conductor A | Conductor B |
|---|---|---|
| Conductor Size | 0.1348 x 0.0351" | 0.1590 x 0.0307". |
| Build, Mils | 5.1 x 4.1 | 4.3 x 4.6. |
| Flexibility before heat aging | 29+% | 23+%. |
| 50-50 solvent resistance | OK | OK. |
| Dielectric, Mercury Immersion | 2,400 volts | 2,800 volts. |
| Dielectric, Aluminum Foil | 4,800 volts | 5,000 volts. |
| Flexibility, 100 hours @ 185° C | 28% | 23%. |

Example 33

This example illustrates the preparation of films from the polyester resins of the present invention. A polyester resin was prepared by heating a mixture of 46 equivalent percent dimethyl terephthalate, 31 equivalent percent ethylene glycol, and 23 equivalent percent glycerin to a final temperature of about 250° C. At this time the resin was allowed to cool to a brittle solid and a portion of this solid was heated with an equal weight of U.S.P. cresol at 100° C. until a homogeneous solution was formed. After cooling, portions of this solution were spread on tin plates and the coated plates were heated at 150° C. for 70 minutes and at 250° C. for 30 minutes. This resulted in a number of cured, transparent polyester resin films. These films were removed from the tin plates by placing a drop of mercury at the edge of the film to amalgamate the surface of the tin film and then peeling the film from the resulting amalgam. Tensile tests of several of these films having a thickness of from about 1.6 to 5.8 mils showed tensile strengths in the range of from 7000 to 9000 p.s.i.

Although the utility of the polyester resins of our invention has been described principally in terms of electrical applications, it should be understood that these resins may be used in all of the other applications suitable for synthetic resins. Thus, these resins can be employed in protective coating applications by applying the resin in a suitable solvent to a surface by brushing or spraying with subsequent curing. When used as a protective coating, these resins have outstanding resistance to weathering and do not discolor after extended exposure to elevated temperatures. These resins can also be employed in varnish and paint formulations. These resins can also be used in molding powder formulations by mixing them with various fillers such as wood flour, diatomaceous earth, carbon, silica, etc. These resins are also useful as impregnants and as bonding materials for metallic and fibrous laminates.

The polyester resins of the present invention may be mixed and cured with minor amounts of other resins such as melamine formaldehyde resins, epoxide resins such as the reaction product of epichlorohydrin and bisphenol-A, phenol formaldehyde resins, aniline formaldehyde resins, urea formaldehyde resins, silicone resins, cellulose acetate resins, polyamide resins, vinyl resins, ethylene resins, styrene resins, butadiene styrene resins, etc.

In the foregoing discussion and examples, we have described the preparation of the polyester resins of the present invention from a mixture of ingredients including a lower dialkyl ester of terephthalic or isophthalic acid. However, it should be understood that instead of the lower dialkyl ester, we may use the acid itself, the chloride of the acid, or the half ester of the acid, but we prefer to use the lower dialkyl ester because of the greater solubility and reactivity of the diester than of the acid itself or its other derivatives.

What we claim as new and desire to secure by Letters Patent of the United States is:

1. A polyester resin consisting essentially of the product of reaction obtained by heating a mixture of (1) from about 25 to 56 equivalent percent of a lower dialkyl ester of a member selected from the class consisting of terephthalic acid and isophthalic acid and mixtures of said members, (2) from about 15 to 46 equivalent percent of ethylene glycol, and (3) from about 13 to 44 equivalent percent of a saturated aliphatic polyhydric alcohol having at least three hydroxyl groups, the sum of the equivalent percents of (1), (2), and (3) being equal to 100 equivalent percent.

2. The resin of claim 1 in which the lower dialkyl ester is a lower dialkyl ester of terephthalic acid.

3. The resin of claim 1 in which the lower dialkyl ester is a lower dialkyl ester of isophthalic acid.

4. The resin of claim 1 in which the lower dialkyl ester is dimethyl terephthalate.

5. The resin of claim 1 in which the lower dialkyl ester is dimethyl isophthalate.

6. The resin of claim 1 in which the polyhydric alcohol is glycerin.

7. The resin of claim 1 in which the polyhydric alcohol is 1,1,1-trimethylol ethane.

8. The resin of claim 1 in which the polyhydric alcohol is 1,1,1-trimethylol propane.

9. The resin of claim 1 in which the polyhydric alcohol is pentaerythritol.

10. The resin of claim 1 in which the polyhydric alcohol is sorbitol.

11. A synthetic polyhydric resin consisting essentially of the product of reaction obtained by heating a mixture of from about 25 to 56 equivalent percent of dimethyl terephthalate, from about 15 to 46 equivalent percent of ethylene glycol and from about 13 to 44 equivalent per cent of glycerin, the sum of the equivalent percents of dimethyl terephthalate, ethylene glycol, and glycerin being equal to 100 equivalent percent.

12. A synthetic polyhydric resin consisting essentially of the product of reaction obtained by heating a mixture of from about 25 to 56 equivalent percent of dimethyl terephthalate, from about 15 to 46 equivalent percent of ethylene glycol, and from about 13 to 44 equivalent percent of 1,1,1-trimethylol ethane, the sum of the equivalent percents of dimethyl terephthalate, ethylene glycol, and 1,1,1-trimethylol ethane being equal to 100 equivalent percent.

13. A polyester resin consisting essentially of the product of reaction obtained by heating a mixture of (1) from about 36 to 50 equivalent percent of a lower dialkyl ester of a member selected from the class consisting of terephthalic acid and isophthalic acid and mixtures of said members, (2) from about 25 to 40 equivalent percent of ethylene glycol, and (3) from about 20 to 32 equivalent percent of saturated aliphatic polyhydric alcohol having at least three hydroxyl groups, the sum of the equivalent percents of (1), (2), and (3) being equal to 100 equivalent percent.

14. The resin of claim 13 in which the lower dialkyl ester is dimethyl terephthalate.

15. The resin of claim 13 in which the lower dialkyl ester is dimethyl isophthalate.

16. The resin of claim 13 in which the polyhydric alcohol is glycerin.

17. The resin of claim 13 in which the polyhydric alcohol is 1,1,1-trimethylol ethane.

18. The resin of claim 13 in which the polyhydric alcohol is 1,1,1-trimethylol propane.

19. The resin of claim 13 in which the polyhydric alcohol is pentaerythritol.

20. The resin of claim 13 in which the polyhydric alcohol is sorbitol.

21. A polyester resin consisting essentially of the product of reaction obtained by heating a mixture of from about 36 to 50 equivalent percent of dimethyl terephthalate, 25 to 40 equivalent percent of ethylene glycol, and from 20 to 32 equivalent percent of glycerin, the sum of the equivalent percents of dimethyl terephthalate, ethylene glycol, and glycerine being equal to 100 equivalent percent.

22. A polyester resin consisting essentially of the product of reaction obtained by heating a mixture of from about 36 to 50 equivalent percent of dimethyl terephthalate, 25 to 40 equivalent percent of ethylene glycol, and from 20 to 32 equivalent percent of 1,1,1-trimethylol ethane, the sum of the equivalent percents of dimethyl terephthalate, ethylene glycol, and 1,1,1-trimethylol ethane being equal to 100 equivalent percent.

23. A polyester resin consisting essentially of the product of reaction obtained by heating a mixture of 45 equivalent percent of dimethyl terephthalate, 33 equivalent percent of ethylene glycol, and 22 equivalent percent of glycerin.

24. A synthetic polyester resin consisting essentially of the product of reaction obtained by heating a mixture of about 37 equivalent percent dimethyl terephthalate, about 36 equivalent percent glycerin, and about 27 equivalent percent of 1,1,1-trimethylol ethane.

25. An insulated electrical conductor comprising, in combination, an electrical conductor coated with a cured polyester resin, said polyester resin consisting essentially of the reaction product obtained by heating a mixture of (1) from about 25 to 56 equivalent percent of a lower dialkyl ester of a member selected from the class consisting of isophthalic acid and terephthalic acid and mixtures of said members, (2) from about 15 to 46 equivalent percent of ethylene glycol, and (3) from about 13 to 44 equivalent percent of a saturated aliphatic polyhydric alcohol having at least three hydroxyl groups, the sum of the equivalent percents of (1), (2), and (3) being equal to 100 equivalent percent.

26. The product of claim 25 in which the lower dialkyl ester is a lower dialkyl ester of terephthalic acid.

27. The product of claim 25 in which the lower dialkyl ester is a lower dialkyl ester of isophthalic acid.

28. The product of claim 25 in which the lower dialkyl ester is dimethyl terephthalate.

29. The product of claim 25 in which the electrical conductor is a copper conductor.

30. An insulated electrical conductor comprising, in combination, an electrical conductor coated with a cured polyester resin, said polyester resin consisting essentially of the reaction product obtained by heating a mixture of (1) from about 25 to 56 equivalent percent of dimethyl terephthalate, (2) from about 15 to 46 equivalent percent of ethylene glycol, and (3) from about 13 to 44 equivalent percent of glycerin, the sum of the equivalent percents of dimethyl terephthalate, ethylene glycol, and glycerin being equal to 100 equivalent percent.

31. An insulated electrical conductor comprising, in combination, an electrical conductor coated with a cured polyester resin, said polyester resin consisting essentially of the product of reaction obtained by heating a mixture of (1) from about 36 to 50 equivalent percent of a lower dialkyl ester of a member selected from the class consisting of isophthalic acid and terephthalic acid and mixtures of said members, (2) from about 25 to 40 equivalent percent of ethylene glycol, and (3) from about 20 to 32 equivalent percent of a saturated aliphatic polyhydric alcohol having at least three hydroxyl groups, the sum of the equivalent percents of (1), (2), and (3) being equal to 100 equivalent percent.

32. An insulated electrical conductor comprising, in combination, an electrical conductor coated with a cured polyester resin, said polyester resin consisting essentially of the reaction product obtained by heating a mixture of (1) from about 36 to 50 equivalent percent of dimethyl terephthalate, (2) from about 25 to 40 equivalent percent of ethylene glycol, and (3) from about 20 to 32 equivalent percent of glycerin, the sum of the equivalent percents of (1), (2), and (3) being equal to 100 equivalent percent.

33. An insulated electrical conductor comprising, in combination, an electrical conductor coated with a cured polyester resin, said polyester resin consisting essentially of the reaction product obtained by heating a mixture of about 45 equivalent percent of dimethyl terephthalate, about 33 equivalent percent of ethylene glycol, and about 22 equivalent percent of glycerin.

34. An insulated electrical conductor comprising, in combination, an electrical conductor coated with a cured polyester resin, said polyester resin consisting essentially of the reaction product obtained by heating a mixture of about 37 equivalent percent of dimethyl terephthalate, about 36 equivalent percent of ethylene glycol, and about 27 equivalent percent of 1,1,1-trimethylol ethane.

35. An insulated electrical conductor comprising, in combination, an electrical conductor coated with a cured polyester resin, said polyester resin consisting of the reaction product of 776 parts of dimethyl terephthalate with from 100 to 200 parts of glycerine and from 200 to 100 parts of ethylene glycol.

36. A composition of matter comprising a cresol as a solvent and a polymeric ester of terephthalic acid with a mixture of glycerine and ethylene glycol, said polymeric ester consisting of the reaction product obtained by heating a mixture of (1) from about 38.5–50 equivalent percent of dimethyl terephthalate, (2) from about 15–41 equivalent percent of ethylene glycol, and (3) from about 13–44 equivalent percent of glycerine, the sum of the equivalent percents of (1), (2) and (3) being equivalent to 100 equivalent percent.

37. An insulated electrical conductor comprising in combination, an electrical conductor coated with a cured polyester resin, said polyester resin consisting of the reaction product of (1) from about 38.5–50 equivalent percent of dimethyl terephthalate, (2) from about 15–41 equivalent percent of ethylene glycol and (3) from about 13–44 equivalent percent of glycerine, the sum of the equivalent percents of (1), (2) and (3) being equivalent to 100 equivalent percent.

38. The process for making a polyester resin which comprises heating within the range of from above room temperature to about 270° C. a mixture containing as essential ingredients (1) a lower dialkyl ester of an acid selected from the class consisting of terephthalic acid, isophthalic acid, and mixtures of said acids, (2) ethylene glycol, and (3) a saturated aliphatic polyhydric alcohol having at least three hydroxyl groups, the aforesaid ingredients being present in an amount equal to from about 25 to 56 equivalent percent of the lower dialkyl ester, from about 15 to 46 equivalent percent ethylene glycol, and from about 13 to 44 equivalent percent of the saturated aliphatic polyhydric alcohol, the sum of the equivalent percents of the above three ingredients being equal to 100 equivalent percent.

39. The process for making a polyester resin which comprises heating within the range of from above room temperature to about 270° C. a mixture containing as essential ingredients dimethyl terephthalate, ethylene glycol, and glycerine, the aforesaid ingredients being present in an amount equal to from about 25 to 56 equivalent percent dimethyl terephthalate, from about 15 to 46 equivalent percent ethylene glycol, and from about 13 to 44 equivalent percent glycerine, the sum of the equivalent percents of the above three ingredients being equal to 100 equivalent percent.

References Cited in the file of this patent

UNITED STATES PATENTS

| | | |
|---|---|---|
| 2,589,652 | Allison | Mar. 18, 1952 |
| 2,686,739 | Kohl | Aug. 17, 1954 |
| 2,686,740 | Goodwin | Aug. 17, 1954 |

FOREIGN PATENTS

| | | |
|---|---|---|
| 629,490 | Great Britain | Sept. 21, 1949 |